N. EATON.
Hay Tedder.
No. 94,480.  Patented Sept. 7, 1869.
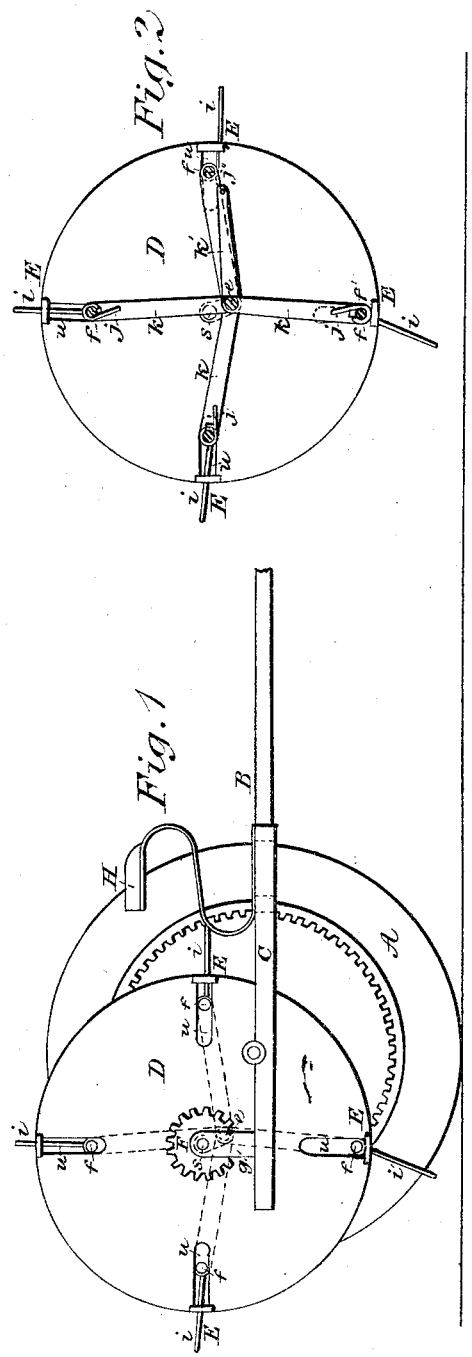
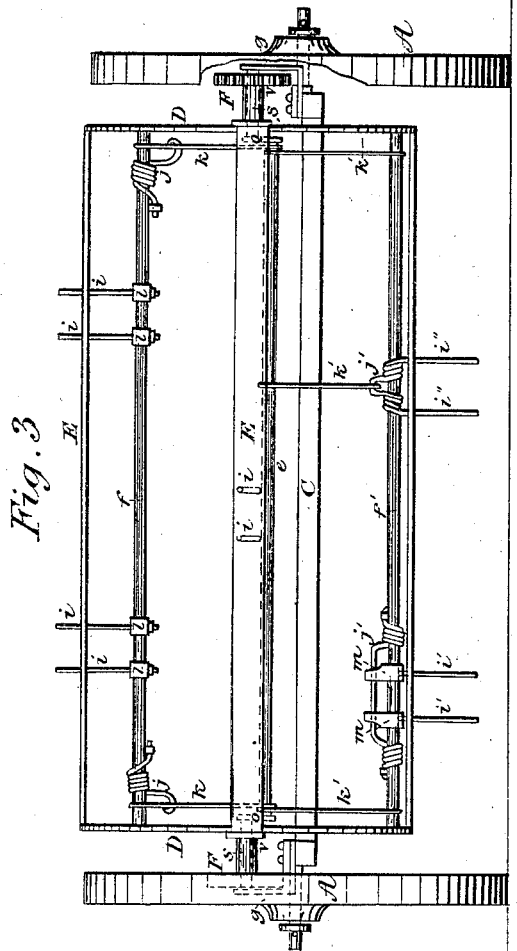
Witnesses:
J. G. Hall
C. Leveur
Inventor:
Norman Eaton

UNITED STATES PATENT OFFICE.

NORMAN EATON, OF WOBURN, MASSACHUSETTS.

Letters Patent No. 94,480, dated September 7, 1869; antedated April 14, 1869.

IMPROVEMENT IN HAY-SPREADERS.

The Schedule referred to in these Letters Patent and making part of the same.

*To all whom it may concern:*

Be it known that I, NORMAN EATON, of Woburn, in the county of Middlesex, and State of Massachusetts, have invented new and useful Improvements in Hay-Tedders; and I do hereby declare that the following is a full and exact description thereof, reference being had to the annexed drawings, making a part of this specification, in which drawings—

Figure 1 in a side view, with one of the driving-wheels removed.

Figure 2 is a rear view.

Figure 3 is a vertical longitudinal section through the central part of the machine, with a projection of the other parts of the reel.

Like letters represent like parts in all the figures.

The nature of my invention consists in constructing a hay-tedder, with forks so arranged as to yield readily when they come in contact with rigid obstacles, said forks being stripped of the hay at a certain point by a stripper, the stripper and teeth revolving upon separate centres, so arranged that the stripping-motion shall be obtained without any unnecessary loss of power.

Also, in constructing the forks, and their supporting-arms, in such a manner that several forks can be held in position and yet allowed to yield to obstacles, by the employment of a single spring at each end of the bar.

Also, in so arranging spring-teeth in a hay-tedder that they can be very readily removed and replaced when injured.

To enable others skilled in the art to make and use my invention, I will proceed to describe its construction and operation.

A A are the wheels.

B B are the shafts.

C is the main frame.

D is the plate-head of the revolving reel, which carries the stripper-arms E.

The plate-head D is provided with radial slots, $u$ $u$, in which the ends of the fork-arms $ff$ play.

$i$ $i$ are the forks, attached to the fork-bars $f$, either rigidly or by a spring, $j$.

The stripper-heads revolve upon the shaft $s$, (see fig. 2,) and are connected, by the tube $r$, to the gear F, which turns upon the same centre as the head D.

Ratchets would be used in a large machine to connect the gears F to the heads D.

The fork-bars $ff$ project at each end through or into the slots $u$ $u$ in the revolving heads D.

The fork-bars $ff$ are also connected by arms, $k$ $k$, to the eccentric-shaft $e$, which is placed below the centre of revolution of the revolving heads D.

The eccentric-shaft $e$ is held in position by the crank-arms $o$ $o$, which project from the shafts $s$ $s$, upon which the heads D D turn.

These shafts $s$ $s$ are in turn held in position by the standards $g$ $g$, projecting from the main frame C.

The teeth $i$ $i$ project through slots in the stripper-bars E E, (see fig. 2,) and are held by springs, as shown in the drawings, to keep them in position to work, but allowing them to yield to obstructions.

One set of the forks is made with a coil-spring, marked $j''$, wound around the fork-bars $f$, which is fastened rigidly to the arms $k'$ $k'$, so that it cannot turn, like the other bars $f$, in its bearings at its ends.

Another set of forks, $i'$ $i'$, on the arm $f'$, is attached to rings, and these rings are held in position by the coil-springs $j'$, which are coiled around the arm $f'$, and attached thereto at its ends, as seen in fig. 2.

On the bars $ff$ the forks $i$ $i$ are attached rigidly, and these bars are allowed to turn in the arms $k$ $k$ and in the slots $u$ $u$.

Coil-springs are attached to the ends of these bars $ff$ in such a manner as always to hold the forks $i$ $i$ in their proper position, but yet allow them to yield when necessary.

The forks $i$ $i$ are constructed of plain and nearly straight pieces of wire, and can very readily be removed and replaced, if injured, and the springs being constructed of separate wires from the forks, are not disturbed by the removal of a fork.

The methods of attaching the springs, either at the end of the bars $f$ or on the bar $f'$, are shown in fig. 2.

H is the seat for the driver.

The operation of this machine is as follows:

The driver rides in the seat H while operating the tedder, and in a full-sized machine the ratchets are arranged to throw the tedder in and out of gear.

As the tedder is drawn forward, the internal gears on the main driving and supporting-wheels, engaging with the pinions F F, communicate motion to these pinions and to the stripper-plate heads D D. The fork-bars $ff$, projecting into the slots $u$ $u$ in the heads D, (as seen in fig. 1,) are made to revolve, but the connecting-arms $k$ $k$ attach these bars $f$ to the eccentric-shaft $e$, and as the fork-bars $ff$ revolve, they are forced out in the slots $u$ $u$ near to the surface of the stripper-reel while passing under the centre, but as they pass up over the centre of revolution they are drawn down from the surface of the stripper-reel; seen in figs. 1, 2, and 3.

The forks $i$ $i$ are connected to the fork-bars $ff$, and are therefore projected and retracted through the stripper-arms E E.

By employing the fork-bars $ff$, in place of extending the forks directly to the eccentric-shaft, I am enabled to have a spring so connected to the forks that they can yield when they come in contact with obstacles, which they could not do if they were driven by the stripper-bars E where they pass through them.

The stripper-bars E E are provided with slots, of any desired length, see fig. 2, which allow the forks to yield on their springs in passing obstacles.

The whole reel is revolved with a backward motion on its lower side. The forks $i\ i$ are projected as they pass near the ground, to pick up the hay. (See fig. 2.) As they revolve up in the rear they are retracted through the stripper-bars, and thus withdraw themselves from the hay, which is thrown lightly back, and left in excellent condition to dry, without any liability of being carried over the reel. The teeth may be made to project and retract to any desired amount, according as the distance is varied between the shaft $e$ and the centre of the rotating stripper-heads D D.

It is indispensable in any hay-tedder that the forks should be allowed to yield to obstacles, and the slots in the stripper-bars E are provided to allow the action of the springs.

Where forks project and retract through small holes in a stripper, they are almost sure to be bent by stones or other obstructions, so that they will not project and retract, and a single fork in this condition would stop the whole machine.

The usual method of providing a spring for the forks, in tedders, has been to provide each fork with a coil at its base, composed of the same piece of wire with the fork, but, when injured, the fork could not be removed without first taking out the bar upon which it was coiled.

I have (in fig. 2) shown several improved methods of giving a spring to the forks, still allowing them to be easily removed.

One set of forks $i'\ i'$, upon the bar $f''$, is connected to rings on the bar. These rings $m$ are kept in position by the coil-springs $j'$, which connect to the bar $f''$. This bar $f''$ is not allowed to turn, like the other bars in the reel, in its bearings at its ends.

Either of the forks $i'\ i'$ can be removed from the rings, without disturbing the coil-springs which hold them in position.

The other set of forks on the arm $f'$ is coiled directly around the arm $f'$, and held in position by the arm $k''$. (See fig. 2.) The bars $f\ f$, either of wood or metal, are held in position by the coil-springs $j$ at their ends, connecting them with the arms $k\ k$. (See fig. 2.)

The forks in the bars $f$ are straight or curved, and are fastened rigidly to the bar. When any of the forks come in contact with an obstacle, the coil-springs on the end of the bar $f$ allow the bar to turn in its bearings, to preserve the fork from injury.

By this method of obtaining a spring for the forks, one or two coil-springs are made to answer for all the forks used on one bar.

A spring may be used on both or on but one end of the bar $f$, as desired, but by the old construction, eight coil-springs were required in a full-sized machine, i. e., a spring to each tine.

It will be readily seen, that by my method of placing a spring on the end of the bar $f$, all the forks will be allowed to spring, and yet will always be brought back again to their working-position as soon as the obstacle is passed, and also that any fork $i$, when injured, may be removed without disturbing the bars $f$, or the coil-springs which hold them in position.

The method of projecting and retracting the teeth through the strippers is much preferable to that of causing the strippers to pass in and out upon the teeth or forks.

I am aware that revolving spring-forks have been used with a reciprocating clearer, but the clearer is usually much heavier than the forks, and therefore it is a great loss of power to reciprocate the clearer. Where the clearer has been reciprocated, it has usually been done by a cam-motion, which is very hard, and objectionable on that account. Therefore I construct the clearer in such cases to revolve uniformly upon a fixed centre, and project and retract the spring-forks through the clearer, making a very light-draught and easy-running machine.

What I claim as new, and desire to secure by Letters Patent, is—

1. The combination, in a hay-tedder, of the following parts, viz: a stripper, revolving on a fixed centre, the forks, when projected and retracted through said stripper, and springs, so arranged as to allow the forks to yield when they come in contact with obstacles, operating substantially as described, and for the purpose set forth.

2. The fork-bar $f$, when arranged to turn in bearings near its ends, and held in position by a spring, connected to it in such a manner as to allow the bar to turn in its bearings, but tending to bring it back to its working-position, substantially as described, and for the purpose set forth.

3. The combination, in a hay-tedder, of a revolving head or arms, to carry the fork-bars, the fork-bars $f$, for supporting the forks $i\ i$, and a spring, so arranged as to hold the bar in proper working-position, allowing it to yield or turn, to prevent the forks from breaking when they come in contact with rigid obstacles, and returning the arm from any angle to which it would be bent by the obstacle to its proper working-position, substantially as described, and for the purpose set forth.

4. The bars $f\ f$, when arranged to approach and recede from the circumference of the head D, in combination with the forks $i\ i$, and springs, arranged to allow the teeth to yield, substantially as and for the purpose set forth.

5. The forks $i\ i$, so arranged as to yield when they come in contact with rigid obstacles, in combination with the revolving stripper-bars E, through which the forks operate, the fork-bars $f$, arranged to play in slots $u\ u$, the connecting-arms $k\ k$, and the eccentric-shaft $e$, operating substantially as described, and for the purpose set forth.

6. The combination, in a hay-tedder, of the forks $i'\ i'$ with a coil-spring at or near their base, the coil and forks being constructed of separate pieces of wire, so that the forks may be readily removed, substantially as described.

7. The coil-springs on the bars $f$, so arranged that a single spring may hold several forks in position, substantially as described, and for the purpose set forth.

NORMAN EATON.

Witnesses:
C. LEREUR,
J. G. HALL.